United States Patent [19]
Schmidt

[11] 3,859,140

[45] Jan. 7, 1975

[54] BATTERY HOLDER

[75] Inventor: Josef Schmidt, Chicago, Ill.

[73] Assignee: Bell & Howell Company, Chicago, Ill.

[22] Filed: June 6, 1973

[21] Appl. No.: 367,512

[52] U.S. Cl. .............................................. 136/173
[51] Int. Cl. ........................................... H01m 1/02
[58] Field of Search .................................... 136/173

[56] References Cited
UNITED STATES PATENTS

| | | | |
|---|---|---|---|
| 2,692,944 | 10/1954 | Mendelson | 136/173 |
| 2,910,580 | 10/1959 | McCleary | 136/173 |
| 3,071,639 | 1/1963 | Mendelson et al. | 136/173 |
| 3,181,974 | 5/1965 | Barbera | 136/173 |

Primary Examiner—Donald L. Walton
Attorney, Agent, or Firm—John R. Hoffman; R. M. Fitz-Gerald; Leon B. Waguespack

[57] ABSTRACT

A battery holder for holding a plurality of cylindrical dry cells in "in-line" configuration. The battery holder is in the form of an elongated trough having end walls provided with slots or slide receivers of identical configuration for receiving a fixed contact plate at one end wall and a grounding base coil of a spring contact member at the other end wall. A plurality of opposing pairs of battery retaining fingers project inwardly at the trough lip to assist in retaining the batteries in the trough. A gap in the fingers at least the length of one battery is provided adjacent one end of the trough for loading the trough with batteries.

8 Claims, 1 Drawing Figure

PATENTED JAN 7 1975
3,859,140
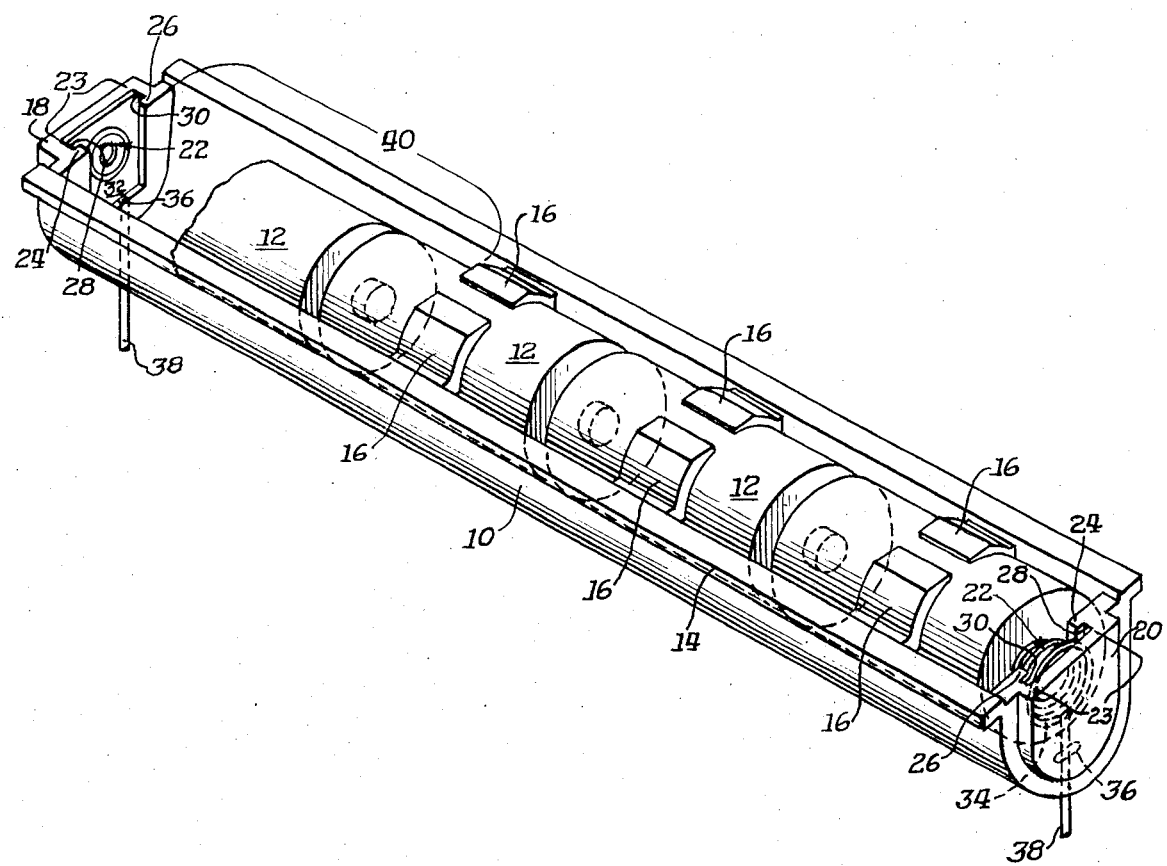

BATTERY HOLDER

BACKGROUND OF THE INVENTION

1. Field of the Invention

This invention relates to a battery container or holder and more particularly a battery holder capable of receiving a plurality of dry cells and retaining the dry cells against buckling under bias of a spring loaded contact. The invention also relates to a new and useful contact system for such a battery holder.

2. Brief Description of the Prior Art

It is a common practice in the manufacture of items utilizing dry cell batteries to employ a fixed contact at one end of a line of batteries and a compression spring contact at the other end. The spring loaded and fixed contact system assures proper electrical contact. However the strong bias of the compression spring tends to cause buckling of the batteries unless the batteries are fully encased, as they usually are in such items as flashlights. Also such systems often employ spring mounts which have inherent weaknesses or are relatively complicated in design.

SUMMARY OF THE INVENTION

The present invention provides a battery holder having an improved contact mounting system which is of simple design. The battery holder employs two end frame members of electrically insulating material which are secured at spaced positions facing each other for contacting one or more "in-line" dry cells positioned therebetween. Each frame member has a molded slide receiver which opens at an edge of the frame member for receiving an electrical contact member. In an especially advantageous form, one receiver contains a fixed contact plate and the other receiver contains the base or grounding coil of a compression spring contact.

The spaced frame members can advantageously form the ends of a battery holding trough having a plurality of linearly spaced pairs of fingers protruding inwardly from the trough lip to retain batteries against buckling and dislodgment from the trough. The fingers are omitted adjacent one end of the trough to provide an entry gap for insertion of the batteries into the trough. The contact receivers are preferably molded into the trough ends and are provided with ports through which lead elements, such as lead wires, can project for connection with electrical circuitry outside of the trough.

While this invention is susceptible of embodiment in many different forms, there is shown in the drawings and will herein be described in detail a specific embodiment thereof, with the understanding that the present disclosure is to be considered as an exemplification of the principles of the invention and is not intended to limit the invention to the embodiment illustrated.

DESCRIPTION OF THE DRAWING

The FIGURE is a perspective view of a form of battery holder of this invention.

DESCRIPTION OF THE PREFERRED EMBODIMENT

Referring to the drawing, the illustrated form of battery holder includes a U-shaped rigid plastic trough 10 of electrically insulating material having a curved bottom wall portion for conforming generally to the configuration of cylindrical dry cells shown at 12. Trough 10 has a pair of strengthening edge flanges 14 extending along the side wall lips. Extending inwardly and upwardly from the inner surface of the trough side walls are three opposing pairs of integral fingers 16 having lower curved surfaces for engaging and blocking the cylindrical dry cells 12 against removal from trough 10.

Identical insulating end walls 18 and 20 are molded integral with the trough 10 to form the trough ends. Each end wall 18, 20 has a rectangular recess indicated at 22 which is open to the interior of trough 10 and which extends to form a slotlike opening 23 at the top inner edge of wall 18, 20 forming the trough end lip. Each recess 22 has a pair of opposing lip flanges 24 and 26 along the sides of the recess 22 defining opposing parallel grooves 28 and 30 extending to the opening 23.

The recess 22 in end plate 18 receives a fixed contact in the form of an electrically conductive plate 32 having parallel edges snug fit in grooves 28 and 30 to secure plate 32 in a position for electrical contact with a top button contact of a dry cell. At the other end of the holder, the recess 22 in end plate 20 receives the base coil of a spring loaded contact, such as the tapered electrical conductive compression coil spring 34, snug fit in the grooves 28 and 30. Each electrical contact 32 and 34 is slidably removable from the recess 22 and the two contacts are interchangeable between the recesses 22 in end plates 18 and 20. Each recess 22 is also provided with a bottom port 36 through which an extension or lead of the electrical contact 32 or 34 can project as seen at 38 for connection to external circuitry.

It should be noted that the opposing fingers 16 secure the dry cells within trough 10 against accidental dislodgment or the like. In order to load the dry cells into trough 10, a gap 40 is provided at one end of trough 10 where the fingers 16 are omitted for a length equal at least to the length of one dry cell, but less than the length of two dry cells. Preferably, gap 40 is provided at the same end as is the spring loaded contact 34.

I claim:

1. A battery holder comprising an elongated open trough for holding a plurality of cylindrical dry cell batteries in "in-line" configuration, said trough having opposing closed end walls of electrically insulating material, a linear array of opposing pairs of fingers projecting inwardly across the trough opening for retaining batteries within the trough and defining a gap at one end of the trough at least the size of one battery for insertion of batteries therethrough into the trough, a slide receiver molded into each end wall extending to an opening at the end wall edge defining the lip of the trough end for receiving slide members through said opening and including means for supporting the slide members within the receivers, a coiled compression spring contact member of electrically conductive material having its grounding base coil received and supported in one end wall receiver, and an electrically conductive fixed contact in the form of a plate member received and supported in the other end wall receiver.

2. The device of claim 1 wherein said gap is adjacent said coiled compression spring contact.

3. The device of claim 1 wherein said slide receivers are formed of a recess extending into the end wall from the inner surface thereof, each recess having a pair of parallel lateral lip flanges extending to said opening to define parallel opposing slots within each recess for receiving slide members through said opening.

4. The device of claim 3 including a port extending through each end wall from the interior of the recess to the exterior of the trough adjacent the bottom of the trough.

5. The device of claim 4 wherein each of said contact members includes an electrically conductive element extending through the recess port to the exterior of the trough for making electrical contact with circuitry to be energized by the batteries.

6. A contact system for batteries comprising a trough, a linear array of opposing pairs of fingers projecting inwardly across said trough for retaining batteries therein, contact elements at opposite ends of said trough providing end frame members of electrically insulating material having generally planar surface portions and an edge for each said surface portion, and means securing said frame members in spaced positions with said surface portions facing each other, a slide receiver molded into each frame member formed of a recess extending into the facing surface portion from the surface thereof and extending to an opening at said edge, each recess having a pair of parallel lateral lip flanges extending to said opening to define parallel opposing slots within each recess for receiving slide members through said opening and supporting the slide members within the opposing slots, an electrically conductive contact spring member received in one of said receivers snug fit within the opposing slots, and an electrically conductive fixed contact received in the other receiver and snug fit within the opposing slots.

7. The device of claim 6 wherein said slide receivers are identical and said electrical contact members are interchangeably mountable in the receivers.

8. A battery holder comprising an elongated U-shaped electrically insulating open trough for holding a plurality of cylindrical dry cell batteries in "in-line" configuration, said trough having a concave bottom wall conforming generally to the cylindrical walls of the batteries and having opposing closed end walls of electrically insulating material and of identical configuration with inner and outer surfaces, a linear array of opposing pairs of fingers integral with the trough side walls and projecting inwardly across the trough opening for retaining batteries within the trough, said fingers leaving a gap at a first end of the trough at least the size of one battery for insertion of batteries therethrough into the trough, an identical slide receiver molded into each end wall formed of a recess extending into the wall from the inner surface thereof and extending to an opening at the end wall edge defining the lip of the trough end, each recess having a pair of parallel lateral opposing lip flanges extending to said opening to define parallel opposing slots within each recess for receiving slide members through said opening and supporting the slide members within the opposing slots, a port extending through each end wall from the interior of the recess to the exterior of the trough adjacent the bottom of the trough, a coiled compression spring contact member of electrically conductive material having its grounding base coil received in the end wall receiver at said first end of the trough snug fit within the opposing slots, and an electrically conductive fixed contact in the form of a plate member received in the other end wall receiver and snug fit within the opposing slots, each of said contact members including an electrically conductive element extending through the recess port to the exterior of the trough for making electrical contact with circuitry to be energized by the batteries and being interchangeable with the other in their respective mounting slots.

* * * * *